United States Patent [19]

Rasmussen

[11] Patent Number: 5,354,427
[45] Date of Patent: Oct. 11, 1994

[54] MANUFACTURE OF MOULDED OBJECTS FROM A FLUIDIZED FIBER RAW MATERIAL

[76] Inventor: Torben Rasmussen, Christoffersalle 63, Lyngby, Denmark, DK-2800

[21] Appl. No.: 3,213

[22] Filed: Jan. 11, 1993

Related U.S. Application Data

[63] Continuation of Ser. No. 678,995, Jun. 25, 1991, abandoned.

[30] Foreign Application Priority Data

Oct. 25, 1988 [DK] Denmark .................... 5922/88

[51] Int. Cl.$^5$ .................... D21B 1/06; D21B 1/08
[52] U.S. Cl. .................... 162/218; 162/149; 162/4; 162/147
[58] Field of Search ............. 162/4, 10, 228, 13, 162/183, 141, 142, 149, 9, 218; 264/87, 86; 425/84, 85

[56] References Cited

U.S. PATENT DOCUMENTS

| | | | |
|---|---|---|---|
| 1,869,491 | 8/1932 | Mursch | 162/4 |
| 2,159,638 | 5/1939 | Schur | 162/218 |
| 2,187,918 | 1/1940 | Sloan | 249/141 |
| 2,236,900 | 8/1941 | Greider | 162/4 |
| 3,001,582 | 9/1961 | Kindseth | 249/113 |
| 3,185,615 | 5/1965 | Reifers | 162/228 |
| 3,353,219 | 11/1967 | Snyder | 249/113 |
| 3,449,207 | 6/1969 | Modersohn | 264/86 |
| 3,736,221 | 5/1973 | Evers | 162/4 |
| 3,741,863 | 6/1973 | Brooks | 162/4 |
| 3,816,241 | 6/1974 | Blume | 162/198 |
| 3,922,191 | 11/1975 | Witt et al. | 425/85 |
| 4,347,099 | 8/1982 | De Ceuter et al. | 162/13 |
| 4,464,224 | 8/1984 | Matolcsy | 162/111 |
| 4,668,339 | 5/1987 | Terry | 162/4 |
| 4,867,383 | 9/1989 | Terry et al. | 162/4 |

FOREIGN PATENT DOCUMENTS

| | | |
|---|---|---|
| 20084917 | 3/1983 | European Pat. Off. . |
| 10246588 | 11/1987 | European Pat. Off. . |
| 164450 | 8/1958 | Sweden . |

Primary Examiner—W. Gary Jones
Assistant Examiner—Brenda Adele Lamb
Attorney, Agent, or Firm—Pennie & Edmonds

[57] ABSTRACT

The invention relates to the manufacture of moulded objects from a fluidized fiber raw material. The fiber raw material used, is a pulp processed from waste paper by slushing the waste paper in a pulper. All or some part of the waste paper added to the pulper is subjected to a separate controlled dry grinding prior to the slushing in the pulper.

8 Claims, No Drawings

MANUFACTURE OF MOULDED OBJECTS FROM A FLUIDIZED FIBER RAW MATERIAL

This is a continuation of application Ser. No. 07/678,995, filed Jun. 25, 1991, now abandoned.

FIELD OF THE INVENTION

The invention concerns a method for the manufacture of objects of a fluidized fibre raw material.

BACKGROUND OF THE INVENTION

The characteristic of the invention is that as fibre raw material, a starting material containing long fibres is used and at least partly processed into a pulp by the application of shake-out or slushing in a pulper, i.e. by forming a pulp slurry. It is also processed partly by a preceding, separate, controlled dry grinding, by means of which it is separated in dosage amounts of separated fibres. The object is manufactured from the pulp thus created.

The application of a pulper as an important processing stage of the fibre raw material so as to create a pulp from which the desired objects are to be manufactured is undertaken in cases where the fibre raw material is received as dry masses in bales, e.g. as paper waste.

In the pulper a heavy whirl formation is produced whereby the single elements of the material rub against each other and thereby become divided, whereby the raw material is separated into fibres.

Especially with heterogeneous material, such as waste and recycled paper, it must be assumed that this separation is going on successively, so that the fibres first released are exposed to a further substantial processing than the fibres released at a later stage. In other words, the processing in the pulper will in its processing thus be uncontrolled, and thereby heterogeneous. The further processing mentioned results in that both the degree of grinding ('SR-Schopper-Riegler), and thereby the binding of water in the pulp, i.e., the mucus creation in the pulper, is increased. This has a negative influence on the later drainage of the object manufactured from the pulp, and increases the shrinkage of the object during the drainage and drying of this material.

SUMMARY OF THE INVENTION

The object of the invention is to provide a method whereby, in order to avoid these disadvantages, a substantially improved control of the separation of the raw material into fibres is achieved before the final manufacture of the objects is undertaken.

A result of the procedure according to the invention is that the fibre raw material added to the pulper is already, to a substantial degree, separated into individual fibres whereby they are more immediately and simultaneously susceptible to the self grinding effect and the mixture effect created in the pulper. As the pulper processes a more uniform raw material the grinding degree produced in the pulper by means of self-grinding can be controlled so as to be more uniform. Also, the previously mentioned binding of water in the pulp leaving the pulper will thereby be easier to control.

The method in accordance with the invention will however also result in other advantages which are especially valuable to the recycling of paper waste.

Recycled paper waste is found in a variety of qualities and grading. If this material, prior to the shake-out in the pulper, is subjected to a separate, controlled dry grinding, it is often possible to use a poorer and thus cheaper quality paper waste than would be used if the separation process was only accomplished by treatment in the pulper.

It is within the scope of the invention to carry out the preceding, separate dry grinding as a multiple-stage process, thus providing a very efficient manner in which to separate the starting material into dosage amounts.

In this manner e.g. it will also be possible to separate into fibres and other particles waste material containing plastic, water resistant paper, plastic laminated carton and paper to the degree desired. Separated particles which are not paper may then before being added to the pulper be removed or it is possible to let these particles into the following production process since they are in divided form.

In another embodiment for the invention, a long-fibre starting material, having been subjected to a separate, controlled dry grinding, may be added to the pulp already created in the pulper and the two then subjected to a common shake-out.

In this way an object may be produced whose fibre material is partly bound by hydrogenous fibre bindings and partly mixed with air suspended fibre material for whose binding glue is normally used.

It has turned out that in this way it is possible to give up a traditional complete hydrogen binding of all the pulp. This means that the drainage time and thereby the production time may be substantially reduced. Furthermore, the procedure facilitates a strict control of the strength properties desired for the object since it is possible to have strict control of these when glue is added.

It will e.g. be possible to carry out a multiple-stage dry grinding by the application of a tearing machine also called a shredder followed by a treatment in a hammer mill. The hammer mill can receive the material from the shredder in dosage amounts and expose the material to a further grinding process before it, if required also in special dosage amounts, is added to the pulper for the actual shake-out processing.

The separate, controlled dry grinding, suggested according to the invention, of the fibre raw materials prior to their shake-out in the pulper also provides the possibility for the co-application of recycled paper waste in cases where the objects to be manufactured must be shrink proof and measure proof. Examples of this are tray or casing shaped packaging for frail objects, such as glassware or eggs. For such packaging a large amount of wood-pulp paper raw material, e.g. up to 80–100 percent is used. A starting material with a high content of wood-pulp fibres results in less shrinkage than if the fibres were cellulose fibres. It has appeared that by application of the method in accordance with the invention to a wood-pulp paper material it is possible to add even a substantial amount of cheap recycling paper waste, including carton waste, which does not necessarily contain wood-pulp. Due to the preceding separate, controlled dry grinding of the raw material, it is possible to manufacture a pulp in the pulper, which does not result any undesired shrinkage of the objects manufactured.

It is a well known principle for the manufacture of objects of a fluidizable fibre raw material to apply auxiliary material such as filling material and chemicals, and binding agents. The auxiliary materials determine whether the manufactured objects shall be more or less strong, hard and transparent, or weak, soft and absorbing. The present invention also has advantages in connection with the application of such auxiliary materials.

The division of the manufacturing process in a number of steps provides increased possibility of addition of auxiliary materials at various stages of the total manufacturing process. The open structure of the final pulp achieved as a result of the invention's characteristic manufacturing processing increases the possibility of the addition of the auxiliary materials so that, for example, a binding agent can be applied and, more or less, integrated into the surface of the manufactured objects so as to produce an increased wall strength. The addition of auxiliary materials during the preceding separate, controlled dry grinding will, in a special good way, produce an extremely uniform distribution of the auxiliary materials in the fibre mass manufactured. Of course the auxiliary materials may also be added to the pulper.

Furthermore, it lies within the scope of the invention that the shake-out in the pulper is carried out as a processing procedure controlled and dependent on the preceding separate grinding. In other words, the degree of self-grinding obtained in the pulper may be adjusted to the degree of the grinding which, according to circumstances, has been carried out at the preceding grinding step(s). As an example, a dry ground fibre material can be added to a paper pulp which, in the pulper, has been separated into a normal grinding degree of 60° SR (Schopper-Riegler) by self grinding. After this addition, the mixture is processed in the pulper for another 5 minutes. Products manufactured from such a mixture pulp may be given a special large thickness, porosity and permeability, and at the same time a low density. This means, that, for example, the products may have good drainage properties, and therefore may be manufactured also with large wall thickness. It is possible, if desired, and in spite of large wall thickness, to maintain a substantial material softness and absorption ability.

Due to these properties, which are common characteristics for all the embodiments of the method according to the invention, the method may advantageously be incorporated in a processing technique for objects which are based on the depositing of the pulp on a contour having suction moulds or endless moulding bans. A pulp manufactured according to the method of the invention permits, without a problem, a uniform distribution of the pulp on the form, even where products with large wall thickness are produced. This means that the objects may have a uniform thickness and thus a uniform strength.

DETAILED DESCRIPTION OF THE INVENTION

A waste paper material containing long fibres is separated into dosage amounts in, for example, two processing stages. First, the material by means of a tearing machine, a so-called shredder, is disintegrated into such a size by which it can be applied in a dosage amount to a hammer mill. In the hammer mill the material, during dry grinding, is further disintegrated and separated into its fibres. Depending on whether the subsequent shake-out in a pulper is undertaken in batches or continuously the dosage material thus achieved may be transported preferably pneumatic to an intermediate stock or direct to the pulper.

The shake-out in the pulper may, for example, be undertaken as follows:

Processing Method a)

All waste paper material is dry ground in he hammer mill whereafter the ground product is processed in the pulper for a short processing time of, for example, 10 minutes. To the pulper may be added auxiliary materials. Furthermore the pulper may have built in separation organs for the dislocation of heavy material particles.

Processing Method b)

In a discontinuously working pulper, waste paper material which has been directly added into the pulper is processed. Approximately 5 to 10 minutes before the termination of this shake-out processing a dry ground waste paper material is added to the pulper in amounts from 5 percent to 50 percent of the final production amount of the pulper. The amount of this addition amount being fixed with a view, for example, to the drainage properties of the final pulp mass or to the structural properties of the desired product. Auxiliary materials if any may be added in desired quantities.

Processing Method c)

In a continuously working pulper, waste paper material which has been directly added into the pulper is processed. This material is continuously added to the pulper. A dry ground waste paper material is added in even dosages to the pulp thus manufactured in amounts from 5 percent to 50 percent of the final production amount of the pulper. The size of the addition amount is fixed with a view to the drainage properties of the final pulp mass or to the structural properties of the desired product. Auxiliary materials if any are dose added. The draining-off of pulp from the pulper is undertaken most expedient by de-pumping.

Processing Method d)

To a pulp which is already processed in a pulper and which may contain a substantial amount of cellulose, a material is added. This added material is or contains dry ground waste paper material as stated in the processing methods a) to c). The addition may, for example, be performed in a special mixture apparatus. This processing method is especially advantageous in order to avoid shrinkage and/or to achieve a special high quality softness of the desired end product.

Waste paper, also called return paper, is of course a very mixed material which contains fibres of many different lengths. However, it has turned out that the average fibre length is so large that especially the drainable and structure advantages may be achieved by the application of different, but separate advantageous processing methods.

It is possible to apply the processing method in accordance with the invention for the manufacture of various kinds of starting materials, including also so-called virgin material. However, the examples show that it also results in major advantages when the starting material is of poorer quality and consists of waste paper.

I claim:

1. A method for the manufacture of objects from a starting material containing fibres according to the following steps:
    (a) dry grinding the starting material to break down the starting material into fibres;

(b) treating dry ground material from step (a) with liquid in a pulper to form a resultant fluidized fibre pulp material;

(c) adding additional dry ground material of the dry grinding step in portions to the pulp material already formed in the pulper, and then subjecting both of them to a pulping treatment in the pulper; and (d) forming discrete moulded objects from said fluidized fibre pulp material by suction removal of liquid contained in said pulp material.

2. A method as claimed in claim 1, wherein said resultant pulp material is partly bound by hydrogen fibre binding and partly bound by glue in forming said objects.

3. A method as claimed in claim 2, wherein the dry grinding step is performed as a multiple-stage process.

4. A method as claimed in claim 2, wherein the treating step is performed as a processing procedure controlled and dependent upon the dry grinding step.

5. A method as claimed in claim 2, wherein auxiliary materials are added at the dry grinding step.

6. A method of producing an object from a fluidized raw material comprising:
(a) providing fibre raw material;
(b) treating said fibre raw material with liquid in a pulper to form a pulp of fibre material;
(c) dry grinding additional fibre raw material;
(d) adding said dry ground fibre raw material to said pulp;
(e) thereafter treating said dry ground fibre raw material and said pulp in said pulper to form a resultant pulp of fibre material;
(f) depositing said resultant pulp on a porous mold; and
(g) forming the object by removing liquid from the resultant pulp and by binding the fibres of the resultant pulp together.

7. A method as claimed in claim 6 further including the step of adding glue to said fibre material whereby said binding of the resultant pulp is partly by hydrogen fibre binding and partly by glue.

8. A method as claimed in claim 6 wherein the fibre material of step (b) which is treated in the pulper is first dry ground.

* * * * *